United States Patent Office
3,460,013
Patented Aug. 5, 1969

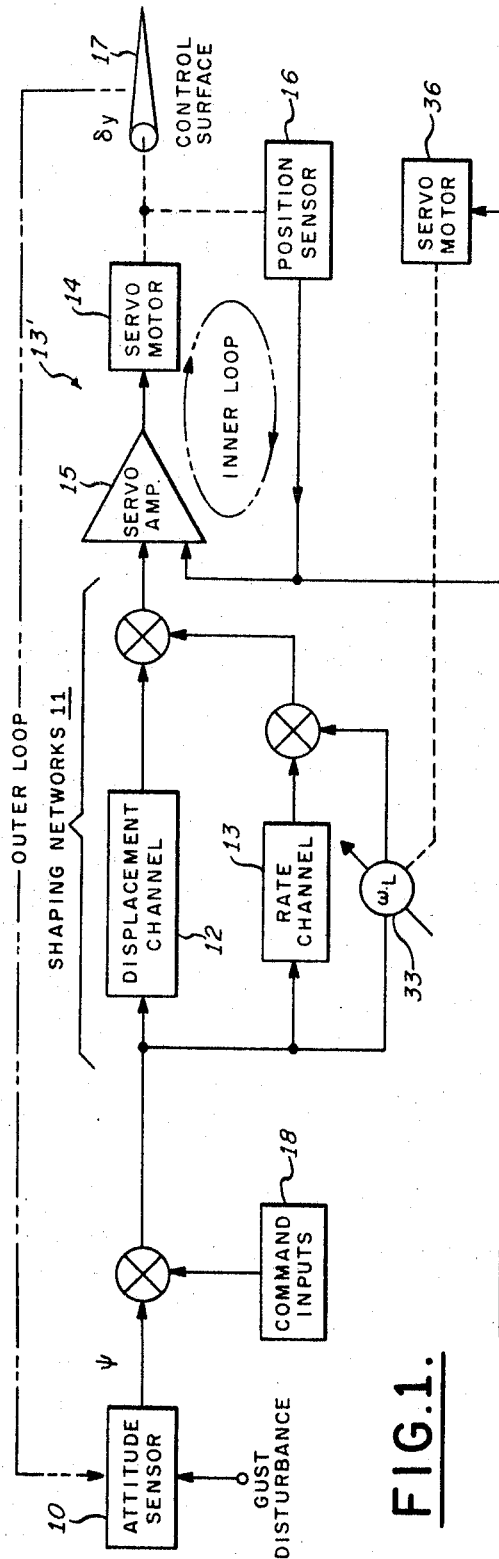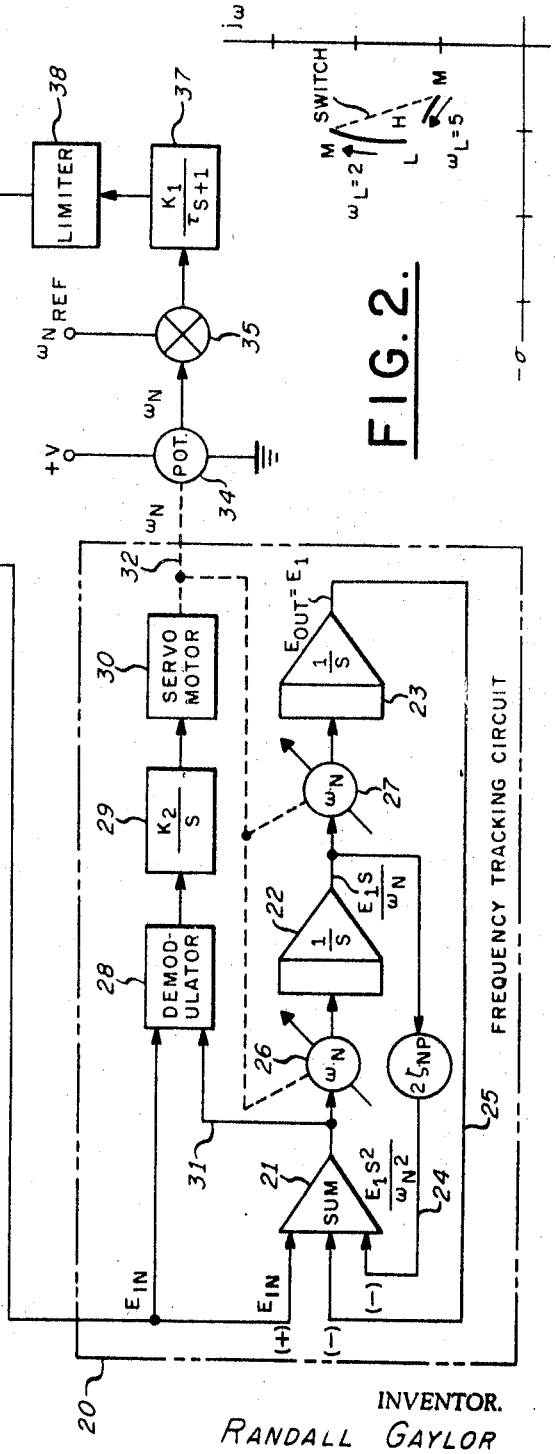

3,460,013
SELF-ADAPTIVE CONTROL SYSTEM
Randall Gaylor, Phoenix, Ariz., assignor to Sperry Rand Corporation, a corporation of Delaware
Filed May 11, 1967, Ser. No. 637,826
Int. Cl. H02p 1/54, 5/46, 7/68
U.S. Cl. 318—18                                    7 Claims

ABSTRACT OF THE DISCLOSURE

A flight control system for stabilizing an aircraft about an axis thereof normally has a natural frequency and hence a damping characteristic that varies in accordance with airspeed. The periodic content of the system controller output, for example the control surface servo position, is predominately at the system natural frequency. This predominate frequency is tracked by varying the frequency characteristic of a second order filter in accordance therewith comparing the tracked frequency with a reference frequency representing a desired fixed system natural frequency and adjusting the frequency response characteristics of the flight control system shaping networks in a manner to maintain the system natural frequency substantially constant over the airspeed range.

Summary of the invention

The present invention relates generally to feedback control systems and more particularly to feedback control systems which are capable of adjusting their own parameters in order to maintain their operation optimum over a wide range of operating conditions. Such systems are known as self-adaptive control systems.

Although self-adaptive systems may find application in many types of industrial controls involving feedback servomechanisms, the present invention will be described generally in connection with the stabilization of one of the control axes of an aircraft which is capable of operation over a wide range of operating conditions. More specifically, the invention will be described in connection with the stabilization of the heading or yaw axis of a helicopter over a range of airspeeds from hover to about 100 m.p.h. However, it is to be understood, of course, that these examples are used for the purpose of description and illustration only since the teachings of the invention may find application in many types of servo systems and in many types of aircraft and autopilot systems therefor, for example fixed wing aircraft, V–STOL aircraft, missiles and the like.

Under many operating modes of an aircraft, it is desired to maintain the yaw, pitch, and roll motions with a high degree of accuracy. For example in a heading hold mode of operation, it is often desired to maintain a high degree of heading accuracy with optimum dynamic damping over the airspeed range of the aircraft, particularly in the case where sighting means is used by the pilot in guiding the aircraft with respect to a target, such as a landing pad or, in a military situation, a target against which weaponry may be effectively directed, without impairing the pilot's or gunner's sighting ability. With the present invention, heading may be accurately held within prescribed limits, say ±½°, and yet be adequately damped over the airspeed range of the aircraft.

For the purposes of illustration, the heading control axis of a single rotor helicopter incorporating the present invention will be specifically described. Basically, such a system is a feedback servo system comprising an inner loop (servo position control, surface position or tail rotor pitch position in accordance with a position command signal) and an outer loop (aircraft position or attitude in accordance with a reference position or attitude). The outer loop comprises three basic subsystems: an attitude displacement sensor subsystem for producing an attitude error signal, a signal shaping subsystem or network which includes circuits for generating a rate of displacement term for dynamically damping the system, and a power subsystem which includes a servo amplifier, servo motor and servo or controller position signal generator, the latter subsystem comprising the inner servo loop.

In another type of system often employed, especially in helicopter type aircraft, the attitude error signal is supplied to two servo systems; one, often termed the trim actuator system, responds directly to the displacement signal to adjust the trim actuator in accordance with long term disturbances, and the other, a short term response system which may be termed a damping actuator, responds to the rate of change of the displacement, either directly from a rate responsive device, such as a rate gyro, or from a rate taking circuit responsive to the attitude error signal. It will be understood that the invention may be applied in either type of system and that the reference herein to coupling circuits is intended to include the rate circuits referred to above or the rate gyro signal transfer circuits.

In order to maintain tight heading accuracy, the displacement gain of the yaw axis automatic control system must be maintained very high, yet, by maintaining such high displacement gain, sufficient dynamic or rate damping cannot be attained over the entire airspeed range without changing the frequency transfer characteristics of the rate transfer or shaping networks.

It has been found in such a system that a fixed transfer characteristic of the shaping or coupling networks is not adequate to provide satisfactory control (tight displacement control with adeqaute dynamic damping) of heading over the entire flight envelope of the aircraft, and also that a significant change in the natural frequency of the closed loop system short period response occurs. A change in the shaping characteristic of the coupling networks with airspeed, as for example by an airspeed switch, tends to keep the natural frequency fairly constant at the airspeed switch positions (e.g. low, medium, high). This fact leads to the thesis that if the natural frequency of the system is detected over the airspeed range, it can be used to adjust the frequency transfer characteristic of the damping networks in a manner to maintain the natural frequency constant, and hence the dynamic damping, without resort to airspeed sensing.

It is, therefore, a primary object of the present invention to provide a self-adaptive automatic control system in which the natural frequency, and hence the damping characteristic, of the system is made substantially constant over a wide range of operating conditions without resort to airspeed sensing.

In a system of the character described above, it has been found that periodic content of the controller or servo output position is predominately at the system natural frequency for each airspeed and coupler circuit transfer characteristic; therefore by sensing or tracking this predominate frequency and adjusting the frequency response characteristic of the coupling network in accordance therewith, a substantially constant natural frequency of the system over the airspeed envelope results.

It is, therefore, another object of the present invention to provide a self-adapting automatic control system wherein the natural frequency of the system is continuously tracked over the range of operating conditions and any error between it and a desired or reference natural frequency is used to vary the frequency response characteristics of the coupling or shaping networks in a manner to maintain the system natural frequency substantially constant.

The present invention includes the frequency tracking apparatus described in my copending application S.N. 484,621, filed on Sept. 2, 1965, entitled "Frequency Tracking Circuits," and assigned to the same assignee as my present invention.

Brief description of the drawings

Other objects and advantages of the present invention will become apparent as a description of one embodiment thereof proceeds, reference being made to the accompanying drawings wherein:

FIG. 1 is a schematic representation of a typical channel of an automatic flight control system embodying the teachings of the present invention; and FIG. 2, the loci of short period closed loop roots plotted as a function of airspeed and useful for a clear understanding of the invention.

Referring now to the upper portion of FIG. 1, there is shown in schematic block diagram form, a typical automatic control and stabilization system for one axis of an aircraft. Such a system comprises generally a sensor 10 of aircraft attitude relative to a reference attitude, such as, for example, displacement type gyroscope for generating a system attitude error signal; shaping networks 11, including displacement and rate channels 12 and 13 respectively the frequency transfer characteristics of which determine, at least in part, the response (tightness of control and dynamic damping) of the system to input disturbances; and power means 13 including servomotor 14, servo amplifier 15 and servo feedback signal generator 16 for positioning the control surface 17 and hence, the aircraft, in accordance with servo input signals. Command inputs 18 to the system are usually provided for changing aircraft position and/or attitude in accordance with a desired flight plan or operating mode.

In some operating modes, it may be desired to hold a particular attitude with a high degree of accuracy, for example, in a heading lock or heading hold mode. Under these conditions it is necessary that the gain of the displacement channel 12 be very high. However, with such high displacement gain, the dynamic damping for the system provided by the rate channel 13 cannot be made adequate over a wide range of operating conditions, for example, over a wide range of airspeeds, without changing the transfer characteristics or shaping of the rate circuits.

The control system feedback transfer function in its simple form may be expressed by $$\frac{\delta}{\psi} = \frac{K(s+\omega_L)}{(s+\alpha\omega_L)} \qquad (1)$$

wherein:

$\delta$ = control surface deflection
$\psi$ = attitude error
$\omega_L$ = lead break frequency of the rate network, and
$\alpha$ = frequency bandwidth over which the rate network is effective
$s$ is the conventional differential operator.

For this system the static gain is $K/\alpha$.

It can be shown by means of the closed loop root locus plots for a plurality of flight conditions and $\omega_L$ values, that for a given value of $\omega_L$ a value of K can be found for each flight condition or airspeed that produces the same natural frequency or damping. Since a different gain K is required at each airspeed to produce this condition, however, varying heading accuracies result at the different airspeeds. Therefore, in order to maintain tight heading accuracy over the airspeed range, the frequency transfer characteristic $\omega_L$ may be varied with airspeed, keeping the gain K constant.

It can also be shown by means of closed loop root locus plots that if $\omega_L$ is varied in accordance with airspeed as by means, for example, of an airspeed switch covering two airspeed ranges from very low (L) to medium (M) and from medium (M) to high (H), both the dynamic damping and system natural frequency increase in the low to medium range, and after switching, a similar increase in both damping and natural frequency in the medium to high speed range. In FIG. 2, such a locus plot of the short period, closed loop roots as a function of airspeed is illustrated; the dotted line indicating switching at the medium airspeed (M). It will be noted that with airspeed switching, the short period roots are in the same frequency range at each airspeed extreme. Thus, a frequency-sensitive adaptive control can be employed to vary the frequency-transfer characteristic of the system error signal coupling network in order to maintain natural frequency and damping substantially constant over the airspeed range without resort to airspeed sensing.

In accordance with the present invention, the actuator output position, as provided by the feedback signal from sensor 16, contains periodic content predominately at the natural frequency indicated by the root locus for each flight condition and setting of the value of $\omega_L$ of the shaping network. Therefore, the natural frequency of the system is sensed and the $\omega_L$ of the coupling network is adjusted so that an approximately constant natural frequency results and hence a substantially constant dynamic damping characteristic over the airspeed range is achieved.

In the lower portion of FIG. 1 there is illustrated a frequency tracking circuit 20 which is connected to receive the servo position feedback signal, track any predominate periodic frequency contained therein and supply an output signal representative of the frequency so tracked. This frequency tracking circuit is of the type disclosed in detail in my above-identified copending application Ser. No. 484,621 and will, therefore, not be discussed in detail herein except to the extent required for a complete understanding of the present invention.

The frequency tracking circuit 20 comprises generally a second order servo system consisting of operational amplifiers and proper feedbacks and may be expressed by the equation for a second order system as follows:

$$\frac{E_{IN}}{E_{OUT}} = \frac{\omega_N^2}{s^2 + 2\zeta_{NP}\omega_N s + \omega_N^2} \qquad (2)$$

The terms resulting in this equation are as noted in FIG. 1 and are provided by summing amplifier 21, integrating amplifier 22, and integrating amplifier 23 connected in series together with velocity feedback 24 determining the damping ratio ($2\zeta_{NP}$) for the loop and the feedback 25 closing the "position" loop. The natural frequency $\omega_N$ of the second order system may be adjusted or varied by means of variable impedance devices such as ganged potentiometers 26 and 27 which vary the gains of the signal inputs to integrators 22 and 23 respectively. The output ($E_{OUT}$) of the second order system 21–27 may be used as the reference voltage of a full wave demodulator 28, the input thereof being the signal the predominate frequency of which is to be tracked. For the present application, however, the output 31 of summing network 21 is used as the reference for the demodulator 28 instead of the output 25 for reasons to be hereinafter explained. The output of demodulator 28 is applied through an integrator network 29 (which determines the gain of the tracking circuit) to drive a servo motor 30 the output of which adjusts the potentiometers 26 and 27 in a sense to maintain the output of demodulator 28 zero, as will be described.

As more fully disclosed in my above-identified copending application, the frequency tracking circuit operation is based upon the phase and gain characteristics of a second order system. From the phase and gain characteristic of the second order transfer function of Equation 2 it can be determined that at frequencies below $\omega_N$ the phase shift of the second order system is between zero and 90°, at $\omega_N$ the phase shift is 90° and at frequencies above $\omega_N$ the phase shift is between 90° and 180°. It is this characteristic that is utilized by frequency tracking circuit 20 to track the predominate frequency contained in the flight control system servo actuator position signal.

Referring again to the frequency tracking circuit 20, the value of $\omega_N$ is adjusted by varying potentiometers 26 and 27 together. The output 31 of summing amplifier 21 is used as a reference voltage for full-wave demodulator 28, which may be of conventional character and being capable of rejecting quadrature and random input signals. The output of demodulator 28 will be a D.C. voltage having plus or minus values depending upon whether the input signal $E_{IN}$ has components in phase of 180° out of phase with the excitation 31. Hence, if the frequency of the input $E_{IN}$ to demodulator 28 includes a predominate frequency $\omega$, the demodulator will be excited with a signal of the same frequency but shifted in phase (the reference voltage has the value $E_1 s^2/\omega_N^2$). As was stated above the $E_{OUT}$ signal could be used as a demodulator reference. However, for the present application this is undesirable since, if a D.C. is present at the input ($E_{IN}$), the output ($E_{OUT}$) will have a D.C. component and thereby cause a demodulator to pass the D.C. output resulting in an undesirable tracking error. This is avoided by using the signal ($E_1 s^2/\omega_N^2$) since it is zero for a D.C. $E_{IN}$ signal.

If the $\omega$ of the input $E_{IN}$ is less than $\omega_N$, an average D.C. output of one polarity will exist at the output of demodulator 28; if the $\omega$ of $E_{IN}$ is greater than $\omega_N$, an average D.C. output of the opposite polarity will exist at the output of demodulator 28. If the $\omega$ of $E_{IN}$ is equal to $\omega_N$, the average D.C. output of demodulator 28 will be zero. Therefore, the demodulator output is applied to a servo motor 30 through a suitable gain control network 29 to drive potentiometers 26 and 27 in a direction and an amount to change $\omega_N$ to the $\omega$ of $E_{IN}$. Thus, the position of the shaft 32 of servo 30 represents the predominant frequency, i.e. the natural frequency $\omega_L$ of the flight control loop.

The manner in which this information is employed in controlling the natural frequency $W_L$ of the flight control system is shown in the right hand portion of FIG. 1. The lead break frequency $W_L$ in the derived rate shaping network 13 is set or adjusted by means of potentiometer 33 which in turn is servo driven as will be described. The closed loop flight control system output, as sensed by the frequency tracking circuit 20, is compared to a reference frequency $\omega_{NREF}$ to which it is desired to maintain the aircraft short period response. The error signal in turn is used to drive a servo which sets the compensation network 13 in a direction and to an amount to tend to maintain the natural frequency of the loop substantially constant. The means by which the foregoing is carried out includes a potentiometer 34 excited by a suitable source of voltage which provides an output voltage having a value determined by the setting ($\omega_N$) of shaft 32. This voltage is compared with a further fixed voltage corresponding to $\omega_{NREF}$ in a suitable comparison or summing circuit 35. This signal is filtered, limited, and applied to a further servo motor 36, the output of which serves to adjust the $W_L$ potentiometer 33. A filter circuit 37 is provided to remove any high frequency noise present in the tracking loop while a limiter 38 is employed to limit the maximum and minimum values to which $\omega_L$ may be adjusted. The limiter provides a safety factor by preventing instability of the flight control system should there be any malfunction in the $\omega_L$ adjusting system.

The adaptive loop gain (adjusted by the value of $K_1$) just described and the tracking circuit gain (adjusted by the value of $K_2$) are adjusted so that the natural frequency $\omega_L$ of the flight control system loop is maintained within very small limits and a well damped system results over the entire flight regime of the aircraft. System response is substantially constant over this range. If the error signal of the flight control loop falls below the threshold required to produce an output from the frequency tracking circuit 20 due, for example, to the absence of a disturbing signal or a relatively high system damping ratio, the servo 36 stops and the adjustment of $\omega_L$ potentiometer 33 remains at its last set position. This feature of the present invention is not found in most self-adaptive flight control systems.

By means of the present invention a very high loop displacement gain is provided with very small acceleration and "jerk" content, the frequency sensing of the control loop short period being used to directly vary system compensation. By allowing the tracking circuit to track the input frequency, it is possible always to operate about the center of the tracking circuit natural frequency thereby producing a much more responsive sensor of frequency error than would be possible with a fixed filter since its bandwidth would have to be wide enough to accept the total frequency range of interest. Furthermore, smooth transition from one operating range to another is obtained, thus making the system especially applicable to aircraft having hovering capabilities.

The foregoing description of an embodiment of the present invention of an electromechanical adjustment of the main servo coupling network has been employed. However, it will be understood that this type of adjustment is illustrated for simplicity of explanation and in actual practice other adjustment techniques may be used without departing from the true scope and spirit of the present invention. For example, a purely solid state digital technique of the character set forth in the above-identified copending application may be used thereby eliminating mechanical devices and inherently increasing the system reliability.

While the invention has been described in its preferred embodiment, it is to be understood that the words which have been used are words of descriptions rather than of limitation and that changes within the purview of the appended claims may be made without departing from the true scope and spirit of the invention in its broader aspects.

I claim:
1. An automatic control system for controlling a condition to maintain a desired condition over a range of operating conditions of said system which affect its ability to maintain said desired condition comprising:
 (a) a closed loop servo system including means for providing a signal representative of the error between an existing condition and the desired condition, power means for controlling the condition, and adjustable coupling means having a frequency response characteristic depending upon the adjustment thereof, said coupling means being responsive to said error signal and having its output signal connected to control said power means in a sense to reduce said error signal, said closed loop system having a natural frequency determined, at least in part, by the characteristic of said coupling means but said natural frequency tending to change with changes in said operating conditions for a given adjustment of said coupling means,
 (b) frequency tracking means connected with said first servo system for detecting and following change in the natural frequency thereof and providing a control signal in accordance with said changes, and
 (c) means responsive to said control signal for adjusting said adjustable coupling means in a sense to maintain the natural frequency of said system substantially constant over said range of operating conditions.

2. The control system as set forth in claim 1 wherein said frequency tracking means comprises a second servo system having its input connected to receive an output signal from said first servo systems, means for adjusting the natural frequency of said second servo system in accordance with changes in frequency of said input, and means responsive to said adjusting means for adjusting the coupling means of said first servo system.

3. The control system as set forth in claim 2 wherein said second servo adjusting means includes means responsive to the frequency response of said second servo to its input and to its input signal for providing a control signal in accordance with the difference therebetween, means for adjusting the frequency response of said second servo in a sense to reduce said control signal to zero, and means responsive to said last mentioned adjusting means for adjusting the coupling means of said first servo system.

4. The control system as set forth in claim 1 further including means for providing a signal representative of a reference frequency corresponding to a predetermined desired natural frequency, means for providing a signal representative of the frequency tracked by said tracking means, said adjusting means including means for providing a signal in accordance with the difference between said signals for adjusting said adjustable coupling means.

5. The control system as set forth in claim 4 wherein said adjusting means further includes limiter means responsive to said difference signals for limiting the adjustment of said coupling means.

6. The control system as set forth in claim 2 wherein said second servo system comprises a second order servo system.

7. A self-adaptive automatic control system for stabilizing an aircraft over a wide range of flight conditions comprising:
(a) means providing a signal corresponding to the error between the actual attitude of the aircraft and a desired attitude thereof,
(b) means for providing a signal corresponding to the rate of change of the attitude of said aircraft,
(c) power means responsive to said attitude signal for controlling said craft attitude and to said rate signal for damping craft movement in response to said attitude signal, said damping effectively varying in accordance with changes in said flight condition.
(d) variable coupling means responsive to said rate signal for varying the frequency transfer characteristics thereof to thereby vary the damping characteristic of said system,
(e) means responsive to the operation of said power means for detecting and tracking its predominate frequency, said predominate frequency corresponding to the natural frequency of said system for the frequency transfer characteristic of said coupling means at a given flight condition,
(f) and means responsive to said last mentioned means for adjusting said variable coupling means in accordance with changes in said natural frequency relative to a predetermined natural frequency due to changes in said flight condition whereby to maintain said natural frequency and damping characteristic substantially constant over said range of operating conditions.

References Cited
UNITED STATES PATENTS

| | | | |
|---|---|---|---|
| 3,137,462 | 6/1964 | Hendrick | 318—489 XR |
| 3,216,676 | 11/1965 | Brown et al. | 318—489 XR |
| 3,287,615 | 11/1966 | Smyth | 318—28 |
| 3,361,394 | 1/1968 | Pfersch | 318—480 XR |

B. DOBECK, Primary Examiner

U.S. Cl. X.R.

318—28, 30